UNITED STATES PATENT OFFICE.

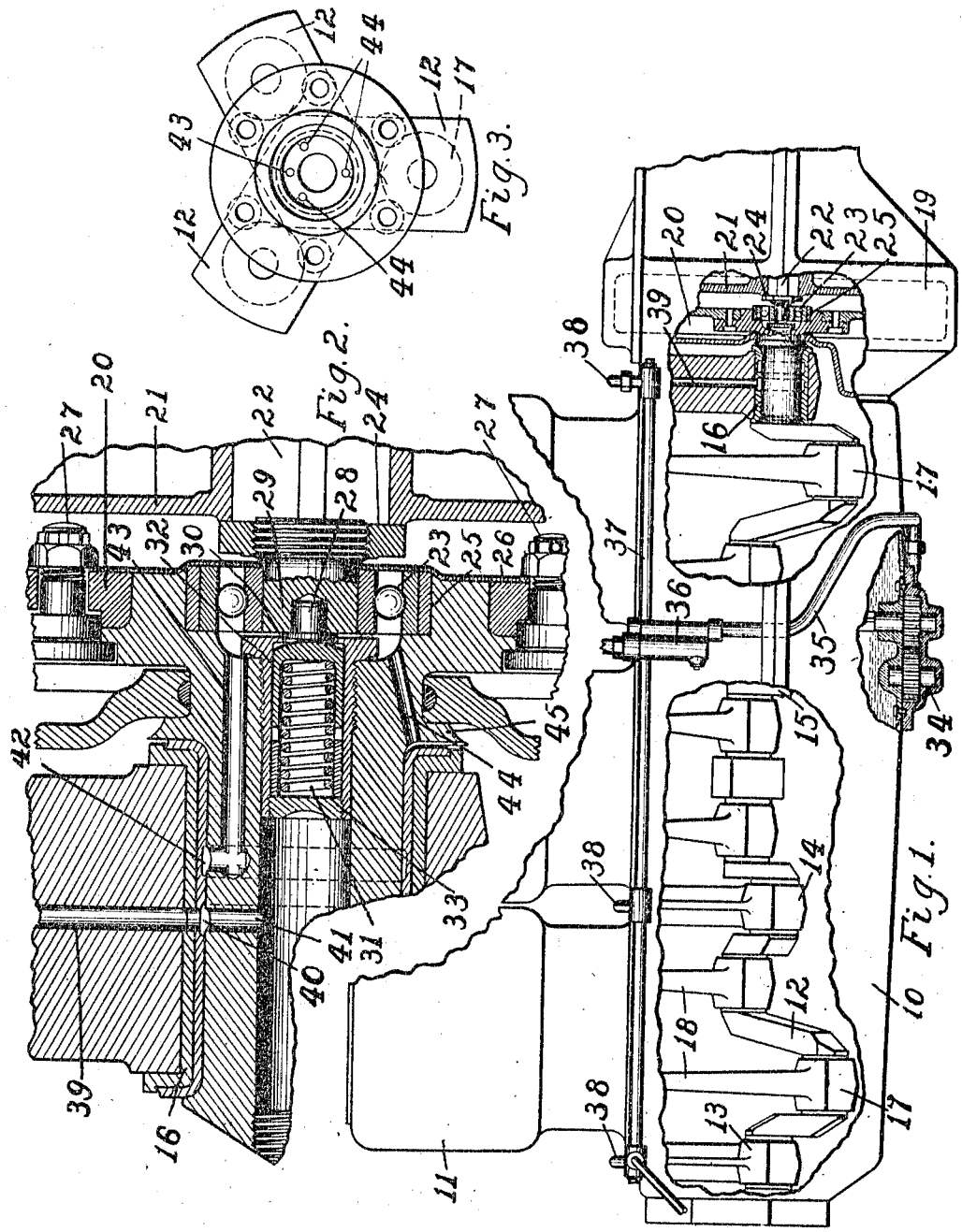

ERWIN C. COOPER, OF DETROIT, MICHIGAN, ASSIGNOR TO PACKARD MOTOR CAR COMPANY, OF DETROIT, MICHIGAN, A CORPORATION OF MICHIGAN.

LUBRICATING SYSTEM.

1,096,491.

Specification of Letters Patent. Patented May 12, 1914.

Application filed January 27, 1913. Serial No. 744,452.

*To all whom it may concern:*

Be it known that I, ERWIN C. COOPER, a citizen of the United States, and resident of Detroit, Wayne county, State of Michigan, have invented certain new and useful Improvements in Lubricating Systems, of which the following is a specification.

This invention relates to hydrocarbon motors, and particularly to means for oiling the bearings of the crank shaft and of the driven shaft to which the crank shaft is connected.

In hydrocarbon motors used for motor vehicle work, the crank shaft of the motor is usually connected with the driven shaft through some form of friction clutch, and the forward end of the driven shaft, or clutch shaft as it is sometimes called, is generally mounted in a bearing in the rear end of the crank shaft. Heretofore this bearing between the crank shaft and the driven shaft has been packed with grease for lubrication, or provided with other more or less non-positive lubricating devices.

The present invention has for its object particularly the positive lubrication of a bearing of this type, and it comprises means for constantly feeding oil to the bearing under pressure and for draining the surplus oil therefrom. Preferably this is combined with a constant circulation system in which the oil in the motor crank case is pumped to the bearings and drained from the bearings back into the crank case.

Other objects and advantages will be apparent from the following description, and the invention consists in the features of construction and arrangement of parts hereinafter more fully described and specified in the claims.

In the drawings, Figure 1 is a side elevation of a motor and its accompanying clutch casing, with parts broken away to show internal construction. Fig. 2 is an enlarged section through the rear main bearing of the motor crank shaft and the forward end of the clutch shaft mounted therein; and Fig. 3 is an end view of the motor crank shaft.

The invention is shown as applied to a six-cylinder hydrocarbon motor of the type usually employed in motor vehicles, and in the drawings, the crank case of the motor is represented at 10 with the cylinder castings 11 mounted thereon. The six throw crank shaft 12 is shown as mounted in four main bearings 13, 14, 15 and 16. For each of the cranks 17 there is a connecting rod 18, on the upper ends of which are the usual pistons which operate in the cylinders. The crank case is extended to form a casing 19 for the flywheel 20 and clutch 21, and in this instance the driven shaft 22 is also the clutch shaft, and its forward end is mounted in a suitable bearing 23 of the annular ball type.

By referring particularly to Fig. 2, it will be seen that the clutch 21 is secured to the clutch shaft 22 by a nut 24, and the bearing 23 is secured in a recess 25 in the rear end of the crank shaft by means of a plate 26 secured to the crank shaft by the bolts 27 that also secure the flywheel 20 thereto. Any end thrust of the clutch shaft 22, caused by engaging and disengaging the clutch, may be taken by a hardened steel button 28 in the forward contracted end 29 of said clutch shaft, this button 28 making approximately point contact with a plunger 30 which is backed by a spring 31 and mounted in a sleeve 32 which is threaded into the bored out end of the crank shaft. The sleeve 32 is closed by a plug 33 which forms an abutment for the spring.

The motor is provided with means for distributing oil under pressure to all of the main bearings. This means comprises a constantly driven oil pump 34, shown as of the gear type, a pipe 35 leading to a strainer 36 and a manifold pipe 37 with branch pipes 38 connecting with drilled passages 39 formed in the crank case casting and extending to each of the main bearings 13, 14, 15 and 16. The main bearing 16 is shown in section and enlarged in Fig. 2, and it will be seen that it is provided with an annular groove 40, whereby the oil delivered through the passage 39 is distributed all the way around the crank shaft bearing, and as the oil is fed under pressure, it is therefore distributed to the entire bearing. The crank shaft is also formed with a passage 41, which constantly registers with the groove 40 and leads some of the oil to the interior of the crank shaft, where it is passed on to the crank pin bearings, as above suggested. For the purpose of this invention, an annular groove 42 is also formed in the main bearing 16 parallel with the groove 40 and slightly rearwardly thereof, as shown particularly in Figs. 1 and 2. This second groove collects some of the oil that passes under pressure through the bearing from the groove 40 and delivers it through an L-shaped passage 43 in the crank shaft to the recess 25 in which the bearing 23 is located. The plate 26, hereinabove described, besides retaining the bearing 23 in place, also nearly closes the recess 25, which thereby forms an annular pocket which retains the oil so delivered to it. It is particularly desirable that the oil which is fed to this bearing 23 shall not be allowed to get into the clutch, as by so doing, the efficiency of the friction elements of the clutch might be seriously impaired. This invention therefore provides very efficient means for draining the oil from the recess 25. To take this surplus oil and return it to the crank case from which it is pumped, a series of channels 44 are formed in the end of the crank shaft extending diagonally and slightly radially from the recess 25 to the exterior of the crank shaft which is exposed to the inside of the crank case. By reason of these channels extending radially from the recess, centrifugal force will tend to draw the oil from the recess and deliver it to the crank case and this is augmented to some extent by an annular flange 45 formed on the crank shaft adjacent the points of outlet of the channels 44. This arrangement is particularly well shown in Fig. 2.

It is a well known fact that in a six-cylinder four-cycle hydrocarbon motor in which the bearings are in ordinary running condition, the crank shaft will practically always stop with two of the cranks approximately in the lowest position, and the other four cranks balancing each other, two of them being 120° upward on one side from the lower cranks and the other two 120° upward on the other side. Advantage is taken of this fact in the present invention, and the drain channels 44 are preferably three in number, and each is arranged in a plane with two of the cranks of the motor, this arrangement being shown particularly in Figs. 2 and 3. With the drain channels in these positions, the recess 25 is sure to be drained of surplus oil whenever the motor stops, as one of these drain channels is sure to be pointing downwardly with two of the cranks of the motor crank shaft. Thus oil is prevented from leaking out of the recess 25 and into the clutch or clutch casing when the motor is stopped.

A specific embodiment of the invention has been shown and described in detail, and it will be specifically claimed, but it will be understood that the invention is not limited to these details, as it will be apparent that changes may be made without departing from the spirit and scope of the invention.

Having thus described my invention, what I claim and desire to secure by Letters Patent is:

1. The combination with a motor crank case and crank shaft therein, of a driven shaft having a bearing in the crank shaft, means for feeding oil to said bearing, and means for draining excess oil therefrom to the crank case.

2. The combination with a motor crank case and crank shaft therein, of a driven shaft having a bearing in the crank shaft, means for feeding oil under pressure to said bearing, and means for draining excess oil therefrom to the crank case.

3. The combination with a motor crank case and crank shaft having bearings therein, of a driven shaft having a bearing in the end of the crank shaft, means for feeding oil to the crank shaft bearings, and means for diverting some of said oil to said driven shaft bearing.

4. The combination with a motor crank case and crank shaft having bearings therein, of a driven shaft having a bearing in the end of the crank shaft, means for feeding oil to the crank shaft bearings, means for diverting some of said oil to said driven shaft bearing, and means for draining excess oil from said latter bearing to the crank case.

5. The combination with a motor crank case and the crank shaft mounted in bearings therein, of a driven shaft having a bearing in the end of the crank shaft, said crank shaft having a channel for conveying lubricant from its bearing to said driven shaft bearing.

6. The combination with a motor crank case and the crank shaft mounted in bearings therein, of a driven shaft having a bearing in the end of the crank shaft, said crank shaft having a channel for conveying lubricant from its bearing to said driven shaft bearing and another and radially extending channel to drain by centrifugal force the excess oil in said latter bearing.

7. The combination with a motor crank case and the crank shaft mounted in bearings therein, of a driven shaft having a bearing in the end of the crank shaft, and means for feeding oil under pressure to said crank shaft bearings, said crank shaft having a channel for conveying lubricant from its bearing to said driven shaft bearing.

8. The combination with a motor crank case and the crank shaft mounted in bearings therein, of a driven shaft having a bearing in the end of the crank shaft, and means for feeding oil under pressure to said crank shaft bearings, said crank shaft having a channel for conveying lubricant from its bearing to said driven shaft bearing and another and radially extending channel to drain by centrifugal force the excess oil in said latter bearing.

9. The combination with a motor crank case and the crank shaft mounted in bearings therein, of a driven shaft having a bearing in the end of the crank shaft, said crank shaft having a channel for conveying lubricant from its bearing to said driven shaft bearing and a series of radially extending channels for draining by centrifugal force the excess oil in said latter bearing.

10. In a multi-cylinder motor having its cranks so arranged that it will usually stop in one of several given positions, the combination with the crank case and crank shaft thereof, of a driven shaft having a bearing in the end of the crank shaft, said crank shaft having a channel adapted to convey oil to said bearing and a plurality of radially extending channels to drain excess oil from said bearing, said latter channels being so arranged that one of them will extend downwardly from said bearing when the motor stops in any one of said several given positions.

11. In a six-cylinder hydrocarbon motor having its cranks so arranged that it will usually stop with two of its cranks at the lower dead center position, the combination with the crank case and crank shaft thereof, of a driven shaft having a bearing in the end of the crank shaft, said crank shaft having a channel adapted to convey oil to said bearing and having drain channels extending from said bearing radially with the cranks of the crank shaft so that one of said latter channels will extend downwardly from said bearing when the motor stops with two of its cranks at lower dead center, whereby the oil in said bearing will be drained into the crank case.

In testimony whereof I affix my signature in the presence of two witnesses.

ERWIN C. COOPER.

Witnesses:
LeRoi J. Williams,
Clarence A. MacDonald.